Dec. 25, 1934.　　　　R. B. MILLER　　　　1,985,682
MOTOR VEHICLE WHEEL
Filed May 15, 1931　　　2 Sheets-Sheet 1

Inventor
RICHARD B. MILLER
By Richey & Watts
Attorneys

Dec. 25, 1934.  R. B. MILLER  1,985,682
MOTOR VEHICLE WHEEL
Filed May 15, 1931    2 Sheets-Sheet 2

Inventor
RICHARD B. MILLER
Richey & Watts
Attorneys

Patented Dec. 25, 1934

1,985,682

UNITED STATES PATENT OFFICE 1,985,682

MOTOR VEHICLE WHEEL

Richard B. Miller, Cleveland, Ohio

Application May 15, 1931, Serial No. 537,571

6 Claims. (Cl. 301—6)

This invention relates broadly to wheels for motor vehicles, and more particularly to metal wheels which in general simulate the conventional wooden-spoke artillery wheel.

An object of the invention is to provide a wheel embodying a spider member which may be readily cast from malleable metal, aluminum alloy or the like in an economical manner and which at the same time is of a self-ventilating type, is so light in weight as to be practical for light duty vehicles, and has beauty of design and follows the modern trend of wheel design.

Another object of the invention is to provide in combination a central wheel-supporting nave member which may be economically produced by casting or forging, a cast metal spider member adapted for demountable association with said nave member, a nave-covering shell member, and a tire rim, these parts when assembled constituting a relatively light yet remarkably strong metal wheel of pleasing design and adaptable for both light and heavy duty vehicles.

In general, the invention contemplates improvements in cast metal wheel construction which will render such type of wheel practical for all kinds of motor vehicles without sacrificing economy in manufacture or beauty of design.

The foregoing and other objects and advantages will become apparent in view of the following description taken in conjunction with the drawings, wherein.

The wheel assembly comprises essentially five main components, namely a wheel-supporting nave member generally designated at A, a spider member generally indicated at B, a rim C, a nave-covering and protecting shell D, and a drum member E.

Figure 2:
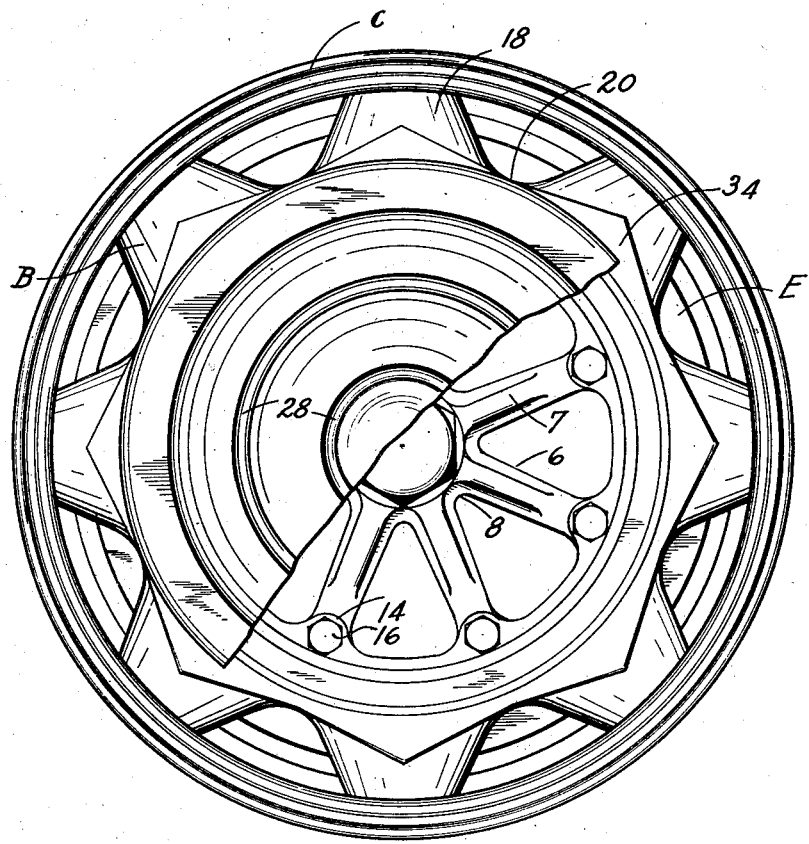
Figure 2 is a view in outboard side elevation of a wheel embodying the features of the present invention with the nave-covering shell partly broken away to show the central or nave construction.

First referring to the wheel-supporting nave member A, this member is preferably of a unitary cast or forged construction and comprises a transversely extended hub barrel 5 which has projected radially therefrom a series of ribs 6 which are reinforced against lateral stresses by means of ribs 7 which at their bases are built substantially across the entire width of the hub barrel and taper radially and merge with the ribs 6. The ribs 6 are also reinforced against torque thrust by means of fillets 8 formed on the circumferential portion of the hub barrel, as will be noted by observing Fig. 2. At their radially outer extremities, the ribs 6 merge with a substantially disk shaped peripheral wall 9 which serves as a support for the spider member B, and accordingly its peripheral surface is preferably tapered as at 10.

It will be seen that the wheel-supporting nave member A may be readily cast or forged as an integral unit, and due to its open reinforced spider like construction, said member is relatively light in weight yet embodies more than ample strength to perform the duty for which it is adapted.

The spider member B is of the cast metal type, and it is so constructed that it may be readily cast as an integral unit, while at the same time being strong and relatively light in weight. This spider member comprises a transversely extended base or hub wall 11 which at its inboard side terminates in the form of an annular bead 12 adapted to seat on the tapered periphery 10 of the spoke-supporting wall 9. Projecting radially inwardly from the bead 12 is a bolting-on flange 13 which is transversely outwardly offset to accommodate the wall 9 and terminates in a plurality of lugs 14 which are formed with openings to receive bolts 15 which are inserted through said lugs and the radially outer extremities of the ribs and have threaded thereon locking nuts 16, by means of which the spider member B is demountably secured to the wheel-supporting member A.

At its outboard side, the base of the hub wall 11 of the spider member B is transversely extended as at 17 for such distance as will bring it preferably beyond the outer end of the hub barrel 5. The nave member A is preferably of a diameter such as will extend for substantially the greater portion of the wheel diameter to provide a large open central nave area and to permit the use of a spider member having relatively short spokes and consequently a spider member which is relatively light in weight. To provide spokes for the spider member B, the hub or base wall 11 is radially extended at spaced points in the form of relatively short hollow projections 18 which are preferably arched transversely and also radially as at 19 and 20. These spokes are hollow and have walls which are preferably of uniform thickness throughout and of substantially the same thickness as the wall 11, to facilitate casting at the foundry and to produce a casting which is free of shrinking strains. The radially outer extremity of each spoke is preferably bridged by a wall 20a, and beyond this wall the spokes are slightly extended as at 21 to accommodate the application of the rim C in a manner to be described. If desired, the spokes may be channel shaped in cross section with the channels opening towards the inboard side of the wheel. However, as here shown, the spokes are closed on the inboard side by a wall 22, while the spoke opens at its base into the hollow open central nave area of the wheel. Due to this construction, the entire central portion of the wheel while in service on the road has air constantly circulating therethrough which serves to ventilate the various parts of the assembly and dissipate heat generated by friction.

While any suitable type of rim may be used with the spider member B, I have shown a rim of the demountable outwardly flanged type. This rim comprises a transverse base 23 which at its inboard side is formed with a flange 24 and at its outboard side is provided with a gutter or hook flange 25 adapted to receive a split flange ring 26 which may be removed to demount the tire, as will be understood. The base 23 of the rim is preferably formed with a series of depressions 27 which are adapted to register with and engage in the recesses at the ends of the spokes defined by the extended wall 21, and provide a driving connection between the rim and spokes. The rim may be given a pressed fit on the ends of the spokes, or secured to the latter in any suitable manner, the method of securing the rim to the spokes forming no part of the present invention. Also, if desired, the conventional "drop center rim" may be used in place of that shown, or any other type of rim may be employed with the spider member in accordance with the specifications of the manufacturers.

In order to protect the relatively large open central nave area of the wheel and to enhance the appearance of the wheel and complete the symmetrical contour of the latter, the shell member D is provided. This shell member may be formed of sheet metal and chrome plated, or given a like decorative design or appearance. As shown, said member is formed with a plurality of annular grooves 28 and is of convex contour. The periphery of said member is preferably formed with an inturned bead 29 which terminates in an annular flange 30 adapted to telescope into the transversely extended portion 17 of the base or hub wall 11. To insure against displacement of the shell D, screws 31 may be employed. While I preferably telescope this shell member D into the wall of the spider member, it is obvious that other suitable means of attaching these parts may be adopted.

To demount the spider member, it is only necessary to remove the shell D to gain access to the nuts 16 and bolts 15, upon removal of which the spider member may be demounted from the wheel-supporting nave member A.

The design of the wheel is such as to permit the use of a brake drum member E having a relatively short attaching flange 32, said web or flange being secured to the peripheral wall 9 of the nave member A in any suitable manner such as by the rivets 33 to thereby serve as a rigid reinforcing means for said wall. A brake drum of this type is desirable inasmuch as it lends itself to formation by means of rolling and welding, altho the same may be readily stamped from suitable material. Furthermore, since the web of the drum embodies a relatively small amount of material, the entire drum may be made of high carbon steel or like hard wear-resisting metal without excessive cost in production. The open inboard side of the wheel from between the web of the drum and the hub barrel 5 may be provided with a suitable shield, not shown, to prevent the ingress of foreign matter into the wheel body at this point. Ordinarily, however, such shield would not be necessary in view of the conventional telescoping type of brake housing used with motor vehicle wheels.

Figure 1:
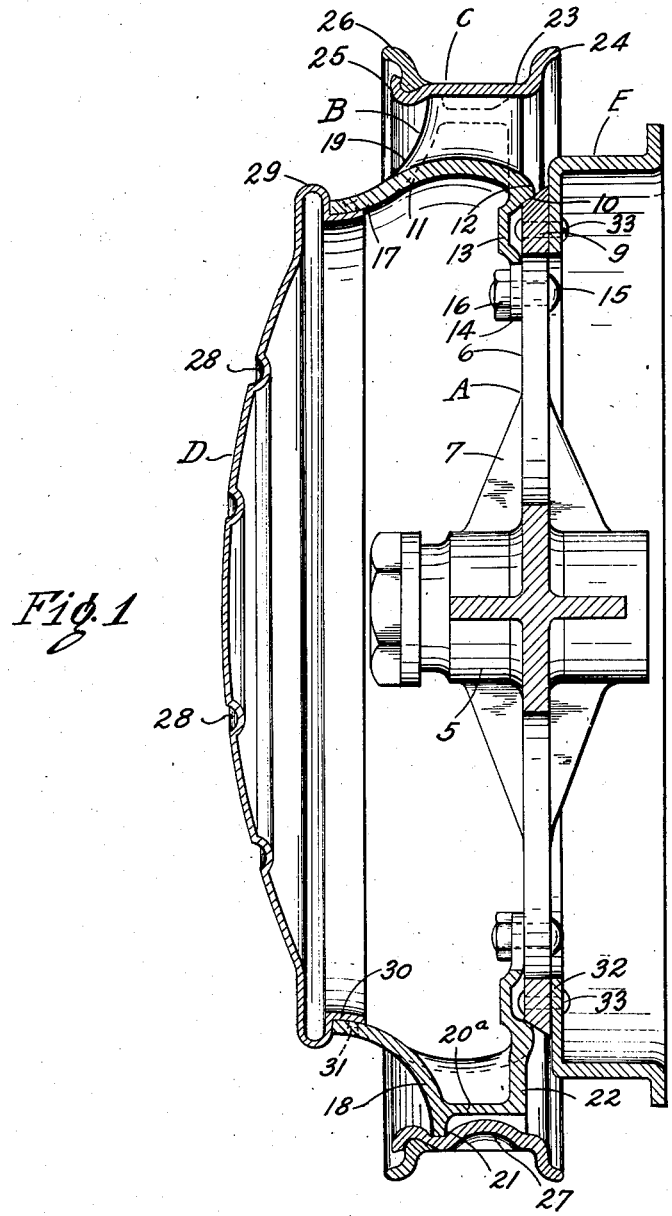
Figure 1 is a view in transverse section taken substantially through the central part of the wheel.

To enhance the appearance of the wheel, I preferably form a suitable design on the spokes as indicated at 34, note Fig. 1. This design may be cast into the metal at the foundry or may be applied in any suitable manner.

Figure 3:
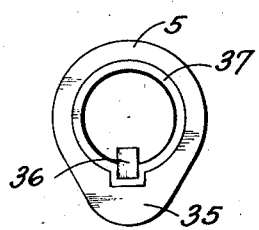
Fig. 3 is an end view of the hub, showing one method of reinforcing the latter when used with a drive axle.

Fig. 3 shows a method of reinforcing the hub 5 of the integral nave and wheel-supporting member A when the wheel is used as a rear or drive wheel. The wall of the hub is thickened, as at 35, adjacent the point where the axle is splined to the hub by means of key 36. If desired, a hard metal wear liner 37 may be employed between the hub and axle in conjunction with or independently of the thickened portion 35.

From the foregoing it will be seen that I have produced a wheel of the cast metal type having relatively short spokes simulating the conventional wooden type wheel, and a large open central nave area which serves to lighten and ventilate the wheel. The nave member A may be readily cast or forged and due to its relatively great diameter the spider member embodies a relatively small amount of metal. This type of nave member also readily adapts the wheel for use with the popular low pressure or exaggerated ballon type of tire, and also adapts the wheel for service with either light or heavy duty vehicles.

It will be understood that the foregoing specific description does not act as a limitation of the wheel construction, but that the scope of the invention is defined by the appended claims.

Having thus described my invention, what I desire to secure by Letters Patent is:

1. In a metal wheel for motor vehicles, a hub barrel having cast integrally therewith a series of ribs which extend radially therefrom and terminate in an annular radial spider-supporting flange, a cast metal spider member formed with short spokes and a transversely-extended wall at the base of the spokes, the inboard side of said wall being formed with a radially-inwardly extending flange contoured to conform to the periphery of said spider-supporting flange and terminating in a series of mounting lugs in transverse alignment with the ends of said ribs, and means for securing said lugs to said ribs at the base of the supporting wall.

2. In a metal wheel for motor vehicles, a hub barrel having cast integrally therewith a series of ribs which extend radially therefrom for the greater portion of the wheel diameter and terminate in an annular radial spider-supporting flange, a cast metal spider member formed with short spokes and a transversely-extended wall at the base of the spokes, the inboard side of said wall being formed with a radially-inwardly extending flange contoured to conform to the periphery of said spider-supporting flange and terminating in locking means adapted for engagement with the supporting flange, a brake drum having a short attaching web secured to said spider-supporting flange and serving to reinforce the latter, a nave-covering and protecting shell associated with the outboard edge of said transversely-extended spider wall, and means for demountably securing said locking means to said supporting flange, said means being exposed when said shell is removed.

3. In a metal wheel for motor vehicles, a hub barrel having cast integrally therewith a series of radially projecting ribs which extend for the greater portion of the wheel diameter and terminate in an annular radial spider-supporting flange, a cast metal spider member formed with short hollow spokes and a transversely-extended wall at the base of the spokes, the inboard side of said wall being formed with a radially inwardly projecting flange which terminates in a series of attaching lugs in transverse alignment with said ribs, said flange being transversely inset to provide an annular shoulder adapted to rest on the periphery of said spider-supporting flange, the outboard side of said transversely extended spider wall terminating in an annular cylindrical portion which leaves the entire nave area of the wheel open for substantially the entire diameter of the spider-supporting ribs and flange, a nave-covering shell telescoped into the outboard side of the transversely extended wall, and means for demountably securing said lugs to the ends of said ribs at the base of the spider-supporting flange.

4. In a metal wheel for motor vehicles, a hub barrel having formed integrally therewith a radially-extended spider-supporting member formed with a beveled bearing periphery, a cast metal spider member formed with a transversely extended arched supporting wall which is projected radially in tubular arched formation at spaced points defining the spokes of the wheel, said transverse wall being formed on its inboard side with an annular shoulder adapted to rest on the beveled bearing periphery of said wall and a radially-inwardly extended flange which terminates in a series of spaced attaching lugs, means for demountably attaching said lugs to said spider-supporting member, and a nave-covering shell telescoped into the outboard edge of said transversely extended spider wall.

5. In a wheel for motor vehicles, a main spider mounting member comprising an integral hub barrel and a radially-extended portion consisting of a series of ribs which terminate in an annular spider-supporting flange formed with a bearing periphery, a brake drum having a relatively short web secured to said flange for stiffening both the flange and drum and co-operatively reinforcing the latter, a cast metal spider member formed with a transversely-extended arched wall and a series of relatively short tapered hollow projections defining the spokes of the wheel, said wall lying in a transverse plane with reference to the periphery of said supporting flange and having the inboard side thereof formed with an annular shoulder adapted to fit on the said bearing periphery of said flange, the wall being extended radially inwardly from said shoulder and provided with means adapted to engage with said spider-supporting flange, means for demountably locking said spider member with said flange, and a shell member telescoped into the outboard side of said transversely extended spider wall and covering the entire open central portion of the wheel.

6. A cast metal wheel assembly for motor vehicles, comprising a spider-mounting member formed with a transversely extended hub barrel and a disk-like spider-supporting portion extended radially therefrom for substantially the greater portion of the wheel diameter, said portion being of spider formation and terminating in a radial flange having a beveled peripheral bearing edge, a cast metal spider member formed with a transversely-extended arched wall of substantially uniform thickness throughout which is projected radially defining relatively short arched and tapered hollow spokes, the inboard side of said wall being formed with a radially-inwardly extended flange which is transversely inset forming a shoulder adapted to engage on the beveled bearing periphery of said radial flange and terminating in a series of attaching lugs, means for demountably securing said lugs to said spider-supporting portion at the base of said flange, and a shell member telescoped in the outboard side of said transversely-extended spider wall to prevent ingress of foreign substances into the interior of the wheel.

RICHARD B. MILLER.